United States Patent
Tamura

(10) Patent No.: US 11,061,494 B2
(45) Date of Patent: Jul. 13, 2021

(54) ELECTRONIC PEN, DISPLAY SYSTEM, AND METHOD FOR CONTROLLING ELECTRONIC PEN

(71) Applicant: SEIKO EPSON CORPORATION, Tokyo (JP)

(72) Inventor: Akihiko Tamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 141 days.

(21) Appl. No.: 16/363,250

(22) Filed: Mar. 25, 2019

(65) Prior Publication Data

US 2019/0294264 A1 Sep. 26, 2019

(30) Foreign Application Priority Data

Mar. 26, 2018 (JP) .............................. JP2018-057644

(51) Int. Cl.
*G06F 3/038* (2013.01)
*G06F 3/0354* (2013.01)
*G09G 3/00* (2006.01)

(52) U.S. Cl.
CPC ........ *G06F 3/0383* (2013.01); *G06F 3/03542* (2013.01); *G06F 3/03545* (2013.01); *G09G 3/001* (2013.01); *G09G 2354/00* (2013.01)

(58) Field of Classification Search
None
See application file for complete search history.

(56) References Cited

U.S. PATENT DOCUMENTS

| 2012/0212415 | A1 | 8/2012 | Yokobayashi |
| 2015/0204658 | A1* | 7/2015 | Tamura ................. G06F 3/0418 356/614 |
| 2017/0322672 | A1* | 11/2017 | Kitani .................... G06F 3/0418 |
| 2018/0074654 | A1* | 3/2018 | Tanaka .................... G06F 3/017 |
| 2018/0164904 | A1* | 6/2018 | Qiao ................... G06F 3/04162 |

FOREIGN PATENT DOCUMENTS

| JP | 2006-162924 A | 6/2006 |
| JP | 2011-28629 A | 2/2011 |
| JP | 2011-204059 A | 10/2011 |
| JP | 2012-173447 A | 9/2012 |
| JP | 2012-181721 A | 9/2012 |
| JP | 2016-186676 A | 10/2016 |
| JP | 2017-92849 A | 5/2017 |
| JP | 2017-138872 A | 8/2017 |

* cited by examiner

*Primary Examiner* — Krishna P Neupane
(74) *Attorney, Agent, or Firm* — Oliff PLC

(57) ABSTRACT

An electronic pen includes: a communication unit which communicates with a communication target apparatus; a state detection unit which detects a state of the electronic pen decided by a relation with the communication target apparatus; and a control unit which changes an operation of the communication unit according to the state detected by the state detection unit.

18 Claims, 4 Drawing Sheets

ELECTRONIC PEN, DISPLAY SYSTEM, AND METHOD FOR CONTROLLING ELECTRONIC PEN

BACKGROUND

1. Technical Field

The present invention relates to an electronic pen, a display system, and a method for controlling an electronic pen.

2. Related Art

A projector system including a projector which projects an image onto a projection surface and a remote control device for remotely controlling the projector is known. A projector of this type starts up on receiving a startup signal from the remote control device (see JP-A-2006-162924).

Also, a display system in which an operation carried out onto a projection image by a user using a position designation device such as an electronic pen is detected is known. A display system of this type has an electronic pen including a light source which emits light, and a camera which captures a projection image. The light emitted from the electronic pen is detected, based on the image captured by the camera (see JP-A-2017-92849).

When the projector is in a standby state where the power consumption is less than in normal operation, the remote control device or the main body of the projector is to be operated to execute cancelation of the standby state. That is, to cancel the standby state of the projector, the user needs to operate the remote control device apart from the electronic pen. This reduces usability such as user-friendliness.

SUMMARY

An electronic pen according to an aspect of the invention includes: a communication unit which communicates with a communication target apparatus; a state detection unit which detects a state of the electronic pen decided by a relation with the communication target apparatus; and a control unit which changes an operation of the communication unit according to the state detected by the state detection unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
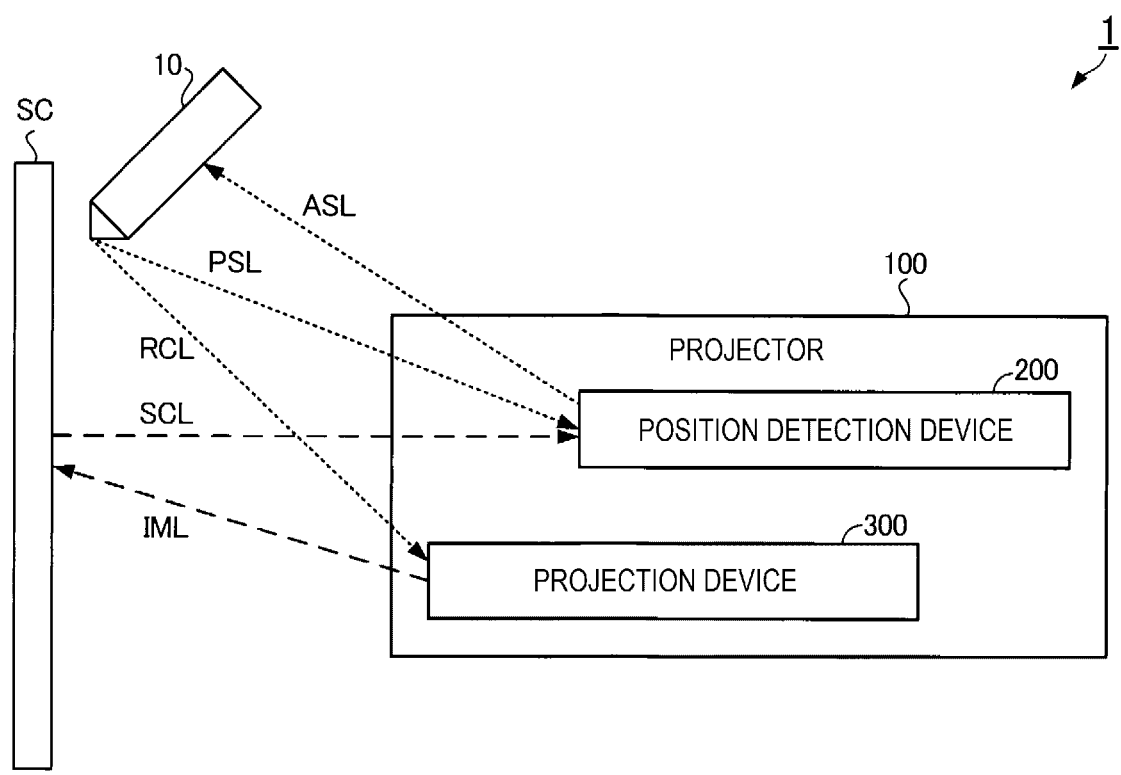
FIG. 1 is a schematic view showing the configuration of a display system 1 according to an embodiment.

Hereinafter, an embodiment will be described with reference to the drawings. In the drawings, the dimension and scale of each part differ from the actual dimension and scale according to need. The description of the embodiment includes various technically preferable limitations. However, the scope of the invention is not limited to these configurations.

First Embodiment

A display system 1 according to an embodiment will be described below with reference to the drawings.

FIG. 1 is a schematic view showing the configuration of main parts of the display system 1 according to the embodiment. The display system 1 according to the embodiment includes an electronic pen 10 and a projector 100 which displays an image on a screen SC. The projector 100 is an example of a display device and a communication target apparatus. The screen SC is an example of a display surface and a projection surface. The display surface and the projection surface are not limited to a screen and can be changed according to need. For example, a wall may be employed.

The electronic pen 10 is a self-light-emitting pointing element with which a user points at the screen SC. The electronic pen 10 includes a communication unit 20 described with reference to FIG. 2 and changes the operation of the communication unit 20 according to the state of the electronic pen 10 decided by the relation with the projector 100.

The state of the electronic pen 10 includes a synchronous state where the electronic pen 10 periodically receives a synchronization signal ASL for synchronizing the operation of the electronic pen 10 with the operation of the projector 100, and an asynchronous state where a period during which the electronic pen 10 does not receive the synchronization signal ASL is a predetermined time or longer. The synchronous state and the asynchronous state are an example of the state of the electronic pen 10 decided by the relation with the projector 100. The synchronization signal ASL is an example of a signal transmitted from the projector 100. The projector 100 is a communication target apparatus for the electronic pen 10.

The projector 100 includes, for example, a normal operation mode where the projector 100 operates normally, and a standby mode where the power consumption is less than in the normal operation mode. In the normal operation mode, the projector 100 transmits the synchronization signal ASL using infrared light at a shorter time interval than the predetermined time. In the standby mode, the projector 100 stops transmitting the synchronization signal ASL. Therefore, if the operation mode of the projector 100 is the normal operation mode, the synchronization signal ASL is periodically transmitted from the projector 100 to the electronic pen 10. The normal operation mode of the projector 100 is an example of a first mode. The standby mode of the projector 100 is an example of a second mode. The predetermined time is set, for example, to be a longer time than a cycle TCY of the synchronization signal ASL, as described later (see FIG. 5).

In the example shown in FIG. 1, the electronic pen 10 switches the light emission pattern of infrared light emitted from the distal end, according to the state of the electronic pen 10. For example, if the electronic pen 10 receives the synchronization signal ASL from the projector 100 at a shorter time interval than the predetermined time, that is, if the electronic pen 10 is in the synchronous state, the electronic pen 10 outputs a pointing element signal PSL synchronously with the synchronization signal ASL. The pointing element signal PSL is, for example, infrared light with a predetermined light emission pattern which causes the projector 100 to detect the position of the electronic pen 10 on the screen SC. The pointing element signal PSL is an example of a signal with a predetermined pattern.

If the electronic pen 10 is in the asynchronous state, the electronic pen 10 outputs a control signal RCL for canceling the standby mode of the projector 100, using infrared light with a different light emission pattern from the pointing element signal PSL, in response to an operation on the electronic pen 10 by the user. For example, the control signal RCL is infrared light with a light emission pattern based on a remote control code used to cancel the standby mode by a remote control device for remotely controlling the projector 100. Therefore, the user can remotely control the projector 100, using the electronic pen 10 instead of the remote control device. The control signal RCL is an example of a signal giving an instruction to shift the operation mode of the projector 100 to the normal operation mode. That is, the light emission pattern of the control signal RCL is an example of a light emission pattern giving an instruction to change the operation mode of the projector 100.

The projector 100 includes a position detection device 200 which detects the position of the electronic pen 10 on the screen SC, and a projection device 300 which projects an image onto the screen SC.

The position detection device 200 periodically outputs the synchronization signal ASL. The position detection device 200 picks up an image of the screen SC at a timing based on the synchronization signal ASL as a reference point and thus generates a picked-up image. For example, when executing calibration to establish a correspondence between positions on the projection image projected on the screen SC and a picked-up image, the position detection device 200 generates a picked-up image based on visible light SCL which the position detection device 200 receives. Also, when detecting the position of the electronic pen 10 on the screen SC, the position detection device 200 picks up an image of the pointing element signal PSL synchronized with the synchronization signal ASL emitted from the distal end of the electronic pen 10 and thus generates a picked-up image. The position detection device 200 detects the position of the electronic pen 10 on the screen SC, based on the picked-up image of the pointing element signal PSL.

For example, if the operation mode of the projector 100 is the standby mode, the position detection device 200 stops the operation of outputting the synchronization signal ASL or the like. In the standby mode, if the position detection device 200 receives an instruction to cancel the standby mode from the projection device 300, the position detection device 200 ends the standby mode and resumes outputting the synchronization signal ASL.

The projection device 300 projects projection image light IML onto the screen SC and thus displays a projection image on the screen SC. The projection image light IML is visible light. If the projection device 300 receives the control signal RCL from the electronic pen 10, the projection device 300 executes processing such as starting up the projector 100 or canceling the standby mode, and instructs the position detection device 200 to output the synchronization signal ASL. In response to the instruction to output the synchronization signal ASL, the position detection device 200 outputs the synchronization signal ASL.

Since the transmission of the synchronization signal ASL is thus executed with the cancelation of the standby mode, the instruction to cancel the standby mode functions as an instruction to transmit the synchronization signal ASL. That is, the control signal RCL also functions as a signal giving an instruction to transmit the synchronization signal ASL, and the light emission pattern of the control signal RCL also functions as a light emission pattern giving an instruction to transmit the synchronization signal ASL.

In this way, the electronic pen 10 according to the embodiment can switch the signal to be emitted between the pointing element signal PSL and the control signal RCL according to the state of the electronic pen 10 decided by the relation with the projector 100. This can improve the usability of the system using the electronic pen 10. For example, the user can transmit the control signal RCL to the projector 100, using the electronic pen 10 instead of the remote control device.

Figure 2:
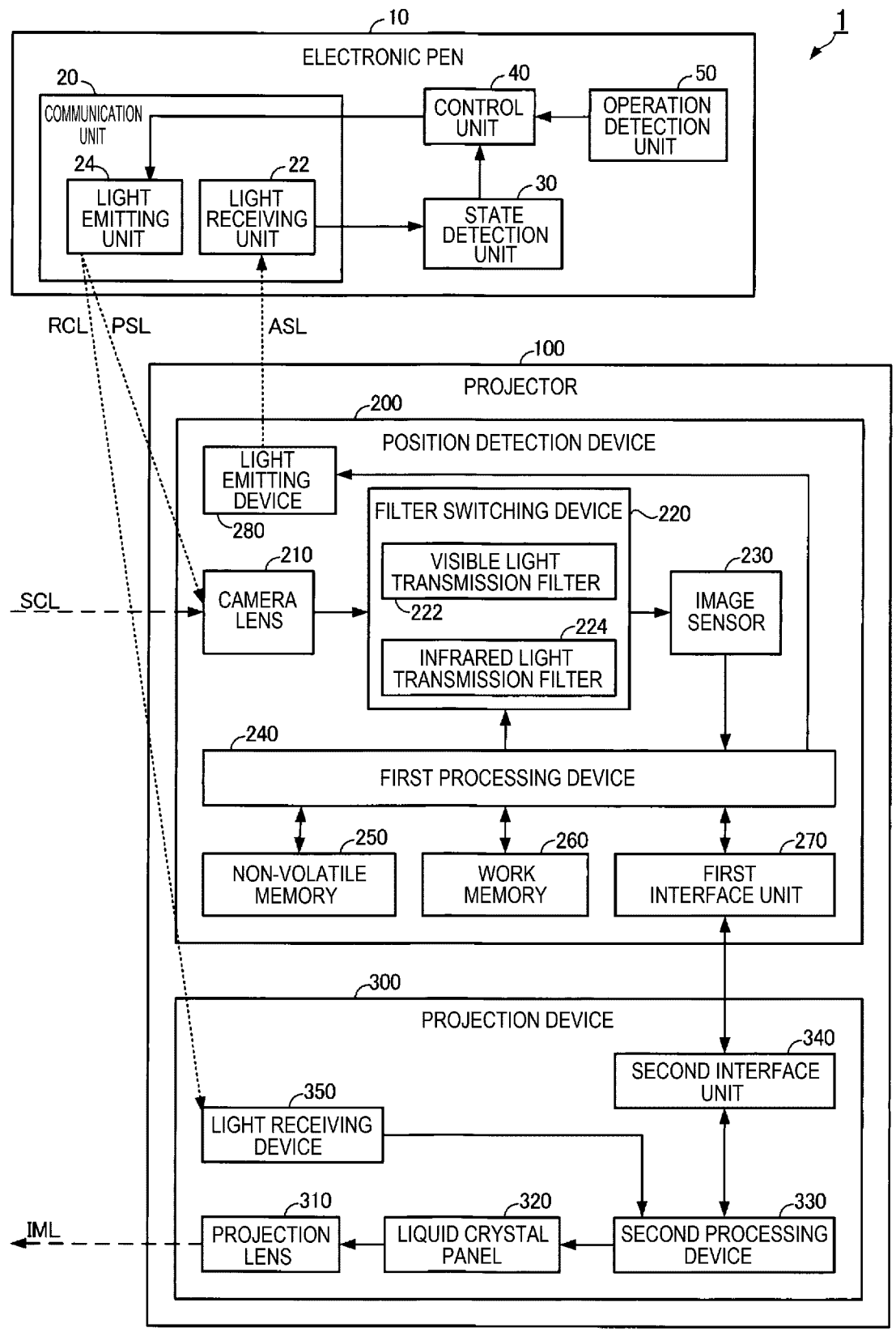
FIG. 2 is a functional block diagram showing each part forming the display system 1.

FIG. 2 is a functional block diagram showing each part forming the display system 1. That is, FIG. 2 shows an example of the configuration of each of the electronic pen 10, the position detection device 200, and the projection device 300. The display system 1 includes the electronic pen 10 and the projector 100. The projector 100 includes the position detection device 200 and the projection device 300.

The electronic pen 10 includes the communication unit 20 which communicates with the projector 100, a state detection unit 30 which detects the state of the electronic pen 10, a control unit 40, and an operation detection unit 50. The communication unit 20 includes a light receiving unit 22 which receives the synchronization signal ASL from the projector 100, and a light emitting unit 24 which emits light based on an instruction from the control unit 40. The light emitting unit 24 is a light source such as a LED (light emitting diode) which outputs infrared light. For example, the light emitting unit 24 emits infrared light with a light emission pattern based on an instruction from the control unit 40 and thus transmits one of the pointing element signal PSL and the control signal RCL.

The state detection unit 30 detects the reception state in the communication unit 20 of the synchronization signal ASL transmitted from the projector 100, as the state of the electronic pen 10. For example, the state detection unit 30 detects whether or not the state of the electronic pen 10 is the asynchronous state, where the period during which the light receiving unit 22 does not receive the synchronization signal ASL is a predetermined time or longer. The state detection unit 30 thus detects the reception state in the communication unit 20.

The control unit 40 changes the operation of the communication unit 20 according to the state detected by the state detection unit 30. For example, if the electronic pen 10 is in the asynchronous state, and the operation detection unit 50, described later, detects an operation on the electronic pen 10, the control unit 40 causes the light emitting unit 24 to emit light with a light emission pattern giving an instruction to cancel the standby mode of the projector 100. That is, when instructing the projector 100 to change the operation mode with the electronic pen 10 in the asynchronous state, the control unit 40 causes the light emitting unit 24 to emit light with the light emission pattern giving an instruction to cancel the standby mode. Therefore, the control signal RCL with the light emission pattern giving an instruction to cancel the standby mode is outputted from the electronic pen 10. The light emission pattern giving an instruction to cancel the standby mode is, for example, a light emission pattern based on a remote control code for controlling the projector 100.

Meanwhile, if the light receiving unit 22 receives the synchronization signal ASL, that is, if the electronic pen 10 is in the synchronous state, the control unit 40 causes the light emitting unit 24 to emit light synchronously with the synchronization signal ASL and with a predetermined light emission pattern for causing the projector 100 to detect the position of the electronic pen 10. Since the pointing element signal PSL synchronized with the synchronization signal ASL is outputted from the electronic pen 10, the electronic pen 10 functions as a pointing element which points at the screen SC. Thus, the control unit 40 switches the light emission pattern of the light emitted from the light emitting unit 24 according to whether the state of the electronic pen 10 detected by the state detection unit 30 is the asynchronous state or not.

The operation detection unit 50 detects an operation on the electronic pen 10 and notifies the control unit 40 of the result of the detection. For example, the operation detection unit 50 detects whether an operation button, not illustrated, provided on the electronic pen 10 is pressed or not. If the operation detection unit 50 detects that the operation button of the electronic pen 10 is pressed, the operation detection unit 50 notifies the control unit 40 that the operation button of the electronic pen 10 is pressed, as an operation on the electronic pen 10.

The position detection device 200 of the projector 100 includes a camera lens 210, a filter switching device 220, an image sensor 230, a first processing device 240, a non-volatile memory 250, a work memory 260, a first interface unit 270, and a light emitting device 280.

The camera lens 210 is, for example, a wide angle lens which can pick up an image over the entirety of a projection image projected on the screen SC. The light such as the visible light SCL condensed by the camera lens 210 reaches the filter switching device 220. If the pointing element signal PSL is emitted from the electronic pen 10, the pointing element signal PSL of infrared light as well as the visible light SCL is condensed by the camera lens 210 and reaches the filter switching device 220.

The filter switching device 220 includes a visible light transmission filter 222 which transmit visible light and blocks infrared light, and an infrared light transmission filter 224 which transmits infrared light and blocks visible light. The filter switching device 220 uses one of the visible light transmission filter 222 and the infrared light transmission filter 224 according to the operation mode of the position detection device 200.

For example, if the operation mode of the position detection device 200 is an automatic calibration mode for establishing a correspondence between positions in a projection image and a picked-up image, the filter switching device 220 uses the visible light transmission filter 222. Therefore, in the automatic calibration mode, the visible light SCL condensed by the camera lens 210 reaches the image sensor 230. Meanwhile, if the operation mode of the position detection device 200 is a pen tracking mode for detecting the position of the electronic pen 10, the filter switching device 220 uses the infrared light transmission filter 224. Therefore, in the pen tracking mode, the pointing element signal PSL of infrared light condensed by the camera lens 210 reaches the image sensor 230.

The image sensor 230 is, for example, an image pickup element such as a CCD (charge-coupled device) image sensor or CMOS (complementary metal-oxide semiconductor) image sensor which converts light into an electrical signal.

The first processing device 240 is, for example, a computer such as a CPU (central processing unit) which controls operations of the position detection device 200. The first processing device 240 may have one or a plurality of processors. For example, the first processing device 240 executes control based on a command received from the projection device 300. The first processing device 240 also processes an electrical signal received from the image sensor 230 and generates a picked-up image. If the operation mode of the position detection device 200 is the automatic calibration mode, the first processing device 240 stores calibration data which represents a result of calibration or the like using the projection image and the picked-up image, into the non-volatile memory 250. Meanwhile, if the operation mode of the position detection device 200 is the pen tracking mode, the first processing device 240 transmits detected position coordinates indicating the position of the electronic pen 10 detected on the basis of the picked-up image, to the projection device 300 via the first interface unit 270.

The non-volatile memory 250 holds information such as the calibration data. The work memory 260 includes, for example, a frame memory and a line memory which has a smaller capacity and a higher speed than the frame memory. The work memory 260 is used to process an image. For example, the frame memory is a DRAM (dynamic random access memory) or the like which can hold image data of one frame. The line memory is a SRAM (static random access memory) or the like which can hold image data of one line.

The first interface unit 270 is, for example, an interface conforming to the USB (Universal Serial Bus), UART (Universal Asynchronous Receiver Transmitter) or similar standard. The first interface unit 270 transmits and receives information such as a command or detected position coordinates.

The light emitting device 280 includes a light source such as a LED which outputs infrared light. The light emitting device 280 emits infrared light and thus transmits the synchronization signal ASL. If the operation mode of the projector 100 is the standby mode, a part of functions of the first processing device 240, the filter switching device 220, the image sensor 230 and the light emitting device 280 or the like stop operating. That is, if the operation mode of the projector 100 is the standby mode, the position detection device 200 stops transmitting the synchronization signal ASL. Since the synchronization signal ASL is not transmitted, the electronic pen 10 stops transmitting the pointing element signal PSL synchronized with the synchronization signal ASL.

If the standby mode is canceled, the position detection device 200 resumes transmitting the synchronization signal ASL. For example, if the first processing device 240 receives a command giving an instruction to cancel the standby mode from the projection device 300 via the first interface unit 270, the first processing device 240 causes the light emitting device 280 to transmit the synchronization signal ASL. Therefore, the electronic pen 10 resumes transmitting the pointing element signal PSL synchronized with the synchronization signal ASL received by the light receiving unit 22.

The projection device 300 includes a projection lens 310, a liquid crystal panel 320, a second processing device 330, a second interface unit 340, and a light receiving device 350.

The projection lens 310 is a lens which projects the projection image light IML received from the liquid crystal panel 320. The liquid crystal panel 320 controls, for example, the projection image. If the operation mode of the projector 100 is the standby mode, the liquid crystal panel 320 may stop operating.

The second processing device 330 is, for example, a computer such as a CPU which controls operations of the projector 100. The second processing device 330 may have one or a plurality of processors. The second processing device 330 also controls the liquid crystal panel 320 to project an image onto the screen SC.

The second processing device 330 decodes a signal received by the light receiving device 350 and controls operations of the projector 100, based on the result of the decoding. For example, if the light receiving device 350 receives the control signal RCL from the electronic pen 10, the second processing device 330 transmits a command giving an instruction to cancel the standby mode to the position detection device 200 via the second interface unit 340. Thus, the second processing device 330 transmits a command or the like for controlling the position detection device 200 to the position detection device 200 via the second interface unit 340. The light receiving device 350 is a light receiving unit for receiving a control signal from the remote control device and can receive infrared light with a light emission pattern based on a remote control code.

The second processing device 330 also draws, for example, a trajectory of the electronic pen 10 on the liquid crystal panel 320, based on detected position coordinates received from the position detection device 200 via the second interface unit 340. Therefore, the trajectory of the electronic pen 10 drawn on the liquid crystal panel 320 is projected onto the screen SC. That is, if the operation mode of the position detection device 200 is the pen tracking mode, the projector 100 can draw the trajectory of the electronic pen 10 onto the projection image. In the description below, the operation mode of the projector 100 when the operation mode of the position detection device 200 is the pen tracking mode is referred to as a pen drawing mode. The pen drawing mode is included in the normal operation mode. That is, the pen drawing mode is an example of the first mode.

The second interface unit 340 is, for example, an interface conforming to the USB, UART or similar standard, and transmits and receives a command or the like. The light receiving device 350 receives the control signal RCL emitted from the electronic pen 10. For example, the light receiving device 350 receives infrared light with a light emission pattern based on a remote control code used by the remote control device for remotely controlling the projector 100. Thus, the projection device 300 can cancel the standby mode of the projector 100 in response to the control signal RCL emitted from the electronic pen 10. This can improve the usability of the projector 100 using the electronic pen 10.

Figure 3:
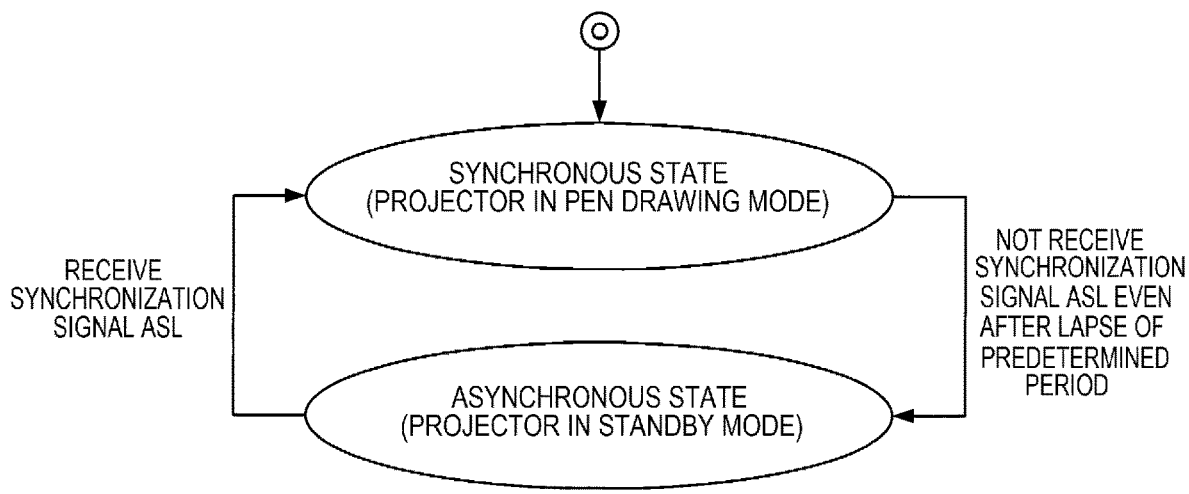
FIG. 3 is an explanatory view showing a transition of the state of an electronic pen 10 decided by the relation with a projector 100.

FIG. 3 is an explanatory view showing a transition of the state of the electronic pen 10 decided by the relation with the projector 100. The modes put in brackets shown in FIG. 3 represent an example of the operation mode of the projector 100 corresponding to the state of the electronic pen 10.

The state of the electronic pen 10 is decided by the relation with the projector 100 and thus becomes one of the synchronous state and the asynchronous state. If the electronic pen 10 receives the synchronization signal ASL from the position detection device 200, the state of the electronic pen 10 is the synchronous state. The synchronous state of the electronic pen 10 corresponds to the pen drawing mode of the projector 100. For example, if the operation detection unit 50 detects an operation on the electronic pen 10, the electronic pen 10 in the synchronous state emits the pointing element signal PSL. The pointing element signal PSL emitted from the electronic pen 10 reaches the image sensor 230 via the camera lens 210 and the infrared light transmission filter 224 of the position detection device 200. In this way, in the synchronous state, the pointing element signal PSL emitted from the electronic pen 10 reaches the image sensor 230 of the position detection device 200, thus executing the notification of the position of the electronic pen 10, the drawing by the electronic pen 10, and the hovering of the electronic pen 10.

If the electronic pen 10 does not receive the next synchronization signal ASL even after the lapse of a predetermined time from the previous reception of the synchronization signal ASL, the electronic pen 10 shifts from the synchronous state to the asynchronous state. That is, if the period during which the communication unit 20 of the electronic pen 10 does not receive the synchronization signal ASL is the predetermined time or longer, the state of the electronic pen 10 is the asynchronous state.

The asynchronous state of the electronic pen 10 corresponds to the standby mode of the projector 100. For example, if the operation detection unit 50 detects an operation on the electronic pen 10, the electronic pen 10 in the asynchronous state emits the control signal RCL. The control signal RCL emitted from the electronic pen 10 reaches the light receiving device 350. Therefore, the second processing device 330 cancels the standby mode in response to the control signal RCL received by the light receiving device 350. As the standby mode of the projector 100 is canceled, the synchronization signal ASL is transmitted from the position detection device 200. On receiving the synchronization signal ASL, the electronic pen 10 shifts from the asynchronous state to the synchronous state.

Figure 4:
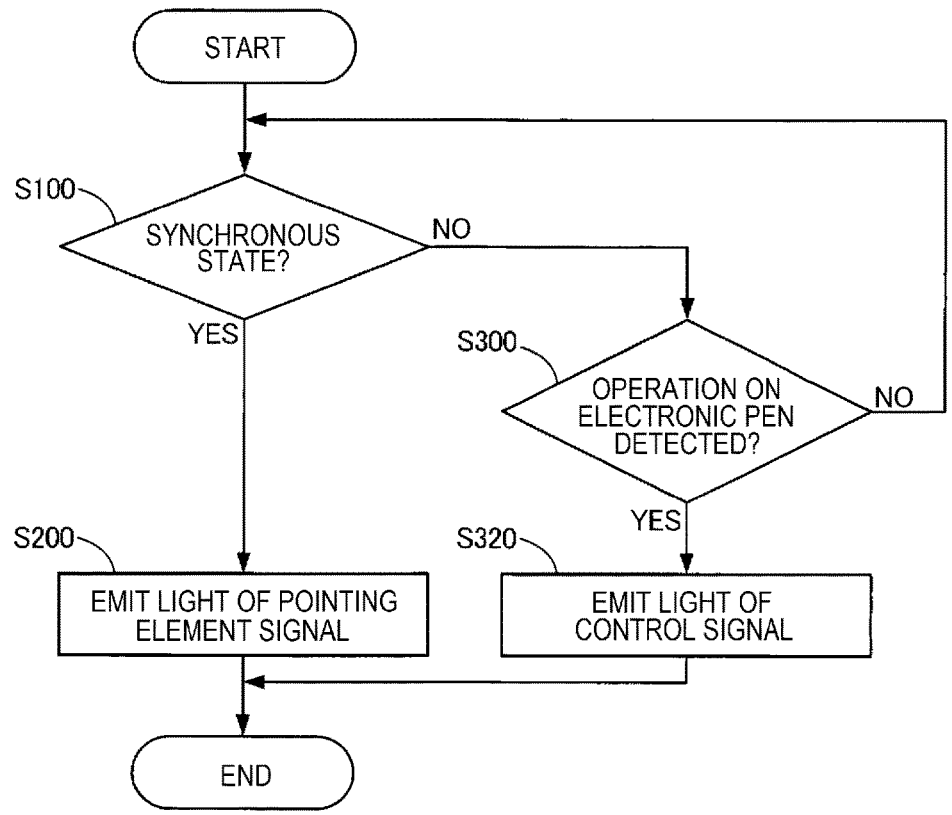
FIG. 4 is a flowchart for explaining an operation of the electronic pen 10.

FIG. 4 is a flowchart for explaining an operation of the electronic pen 10. The operation shown in FIG. 4 is an example of a method for controlling the electronic pen 10.

In step S100, the control unit 40 determines whether the state of the electronic pen 10 detected by the state detection unit 30 is the synchronous state or not. If the state of the electronic pen 10 is the synchronous state, the operation of the electronic pen 10 shifts to step S200. Meanwhile, if the state of the electronic pen 10 is not the synchronous state, that is, if the state of the electronic pen 10 is the asynchronous state, the operation of the electronic pen 10 shifts to step S300.

In step S200, the control unit 40 causes the light emitting unit 24 to emit light of the pointing element signal PSL. As the light emitting unit 24 emits the light of the pointing element signal PSL, the electronic pen 10 can execute notification of the position, drawing, hovering and the like.

In step S300, the control unit 40 determines whether the operation detection unit 50 has detected an operation on the electronic pen 10 or not. If the operation detection unit 50 has detected an operation on the electronic pen 10, that is, if the projector 100 is to be instructed to cancel the standby mode, the operation of the electronic pen 10 shifts to step S320. Meanwhile, if the operation detection unit 50 has not detected an operation on the electronic pen 10, the operation of the electronic pen 10 returns to step S100.

In step S320, the control unit 40 causes the light emitting unit 24 to emit light of the control signal RCL. On receiving the control signal RCL, the projector 100 cancels the standby mode. As the standby mode of the projector 100 is canceled, the position detection device 200 of the projector 100 transmits the synchronization signal ASL to the electronic pen 10. Thus, the state of the electronic pen 10 shifts from the asynchronous state to the synchronous state.

Figure 5:
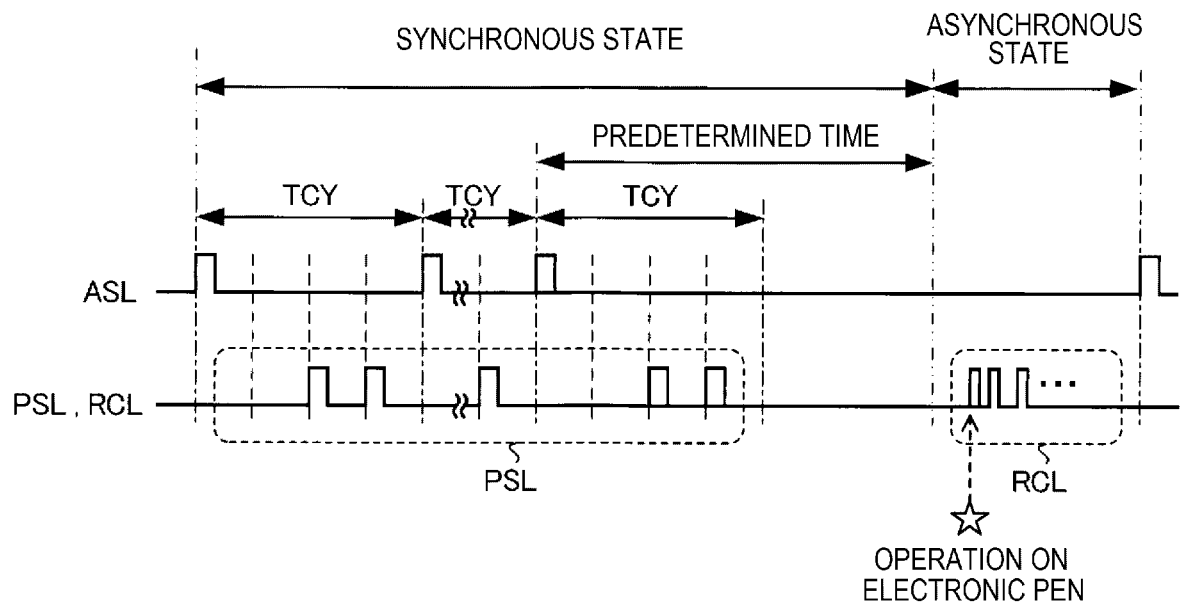
FIG. 5 shows an example of a light emission pattern according to the state of the electronic pen 10.

FIG. 5 shows an example of the light emission pattern corresponding to the state of the electronic pen 10. A star symbol shown in FIG. 5 indicates the timing when the user executes an operation on the electronic pen 10, that is, the timing when the operation detection unit 50 detects an operation on the electronic pen 10.

The synchronization signal ASL is transmitted on a predetermined cycle TCY from the position detection device 200. In the synchronous state, where the electronic pen 10 receives the synchronization signal ASL on the predetermined cycle TCY from the position detection device 200, the electronic pen 10 emits the light of the pointing element signal PSL synchronously with the synchronization signal ASL. In the example shown in FIG. 5, the cycle TCY of the synchronization signal ASL is divided into four periods, and during the latter two periods, infrared light is emitted as the pointing element signal PSL.

If the electronic pen 10 does not receive the next synchronization signal ASL even after the lapse of a predetermined time from the previous reception of the synchronization signal ASL, the state of the electronic pen 10 shifts from the synchronous state to the asynchronous state. The predetermined time is set to be longer than the cycle TCY of the synchronization signal ASL.

In the asynchronous state, if an operation on the electronic pen 10 is detected, the electronic pen 10 emits the light of the control signal RCL. For example, the electronic pen 10 emits infrared light of a remote control code modulated at 38 KHz, as the control signal RCL. Therefore, the electronic pen 10 can execute startup of the projector 100, cancelation of the standby mode of the projector and the like. On receiving the control signal RCL, the projector 100 resumes transmitting the synchronization signal ASL.

In this way, in the display system 1 according to the embodiment, if the operation mode of the projector 100 is the normal operation mode such as the pen drawing mode, the projector 100 transmits the synchronization signal ASL on the cycle TCY, which is shorter than the predetermined time. If the operation mode of the projector 100 is the standby mode, the projector 100 does not transmit the synchronization signal ASL.

Therefore, if the period during which the communication unit 20 does not receive the synchronization signal ASL is shorter than the predetermined time, the control unit 40 of the electronic pen 10 causes the communication unit 20 to transmit the pointing element signal PSL synchronously with the synchronization signal ASL. Meanwhile, if the period during which the communication unit 20 does not receive the synchronization signal ASL is equal to or longer than the predetermined time and the operation detection unit 50 detects an operation on the electronic pen 10, the control unit 40 of the electronic pen 10 causes the communication unit 20 to transmit the control signal RCL. The electronic pen 10 can change the operation of the communication unit 20 according to the state of the electronic pen 10 decided by the relation with the projector 100. This can improve the usability of the display system 1.

Modifications

Each of the configurations described above can be modified in various manners. Specific modifications are described below. Two or more arbitrarily selected from the following modifications can be combined together according to need unless contradicting each other.

Modification 1

Figure 6:
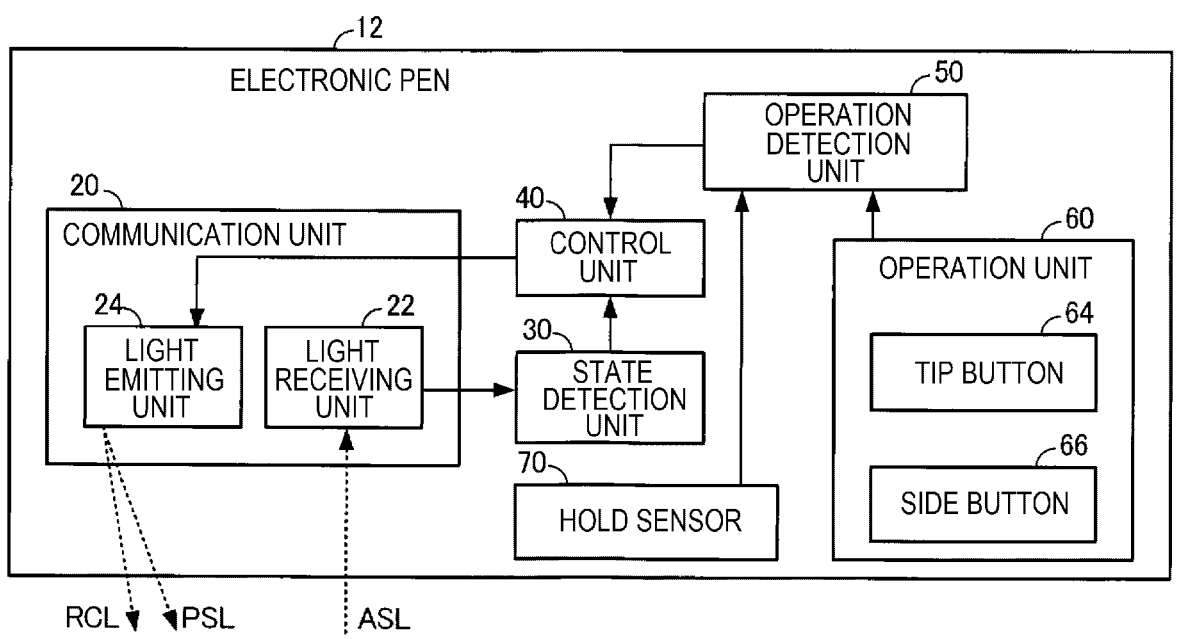
FIG. 6 is a functional block diagram showing an electronic pen 12 according to a modification of the electronic pen 10 shown in FIG. 2.

FIG. 6 is a functional block diagram of an electronic pen 12 as a modification of the electronic pen 10 shown in FIG. 2. Elements that are the same as or similar to those described with reference to FIG. 2 are denoted by the same reference numbers and are not described further in detail. The electronic pen 12 is the same as or similar to the electronic pen 10 except that an operation unit 60 and a hold sensor 70 are added to the electronic pen 10 shown in FIG. 2. For example, the electronic pen 12 includes the communication unit 20, the state detection unit 30, the control unit 40, the operation detection unit 50, the operation unit 60, and the hold sensor 70.

The operation unit 60 includes a tip button 64 and a side button 66 which are operated by the user of the electronic pen 12. The operation unit 60 is assigned different kinds of processing according to the state of the electronic pen 12.

The tip button 64 is provided, for example, at a distal end part of the electronic pen 12. For example, if the state of the electronic pen 12 is the synchronous state, a press on the tip button 64 is assigned processing equivalent to a left click on a mouse. If the state of the electronic pen 12 is the asynchronous state, a press on the tip button 64 is assigned processing of giving an instruction to cancel the standby mode of the projector 100.

The side button 66 is used, for example, for a right click on a mouse or the like. If the side button 66 is used for a right click on a mouse and the state of electronic pen 12 is the synchronous state, a press on the side button 66 is assigned processing equivalent to a right click on a mouse. If the state of the electronic pen 12 is the asynchronous state, a press on the side button 66 is assigned processing of giving an instruction to cancel the standby mode of the projector 100.

In this way, each of the tip button 64 and the side button 66 is assigned different kinds of processing according to the state of the electronic pen 12. A press on each of the tip button 64 and the side button 66 is detected by the operation detection unit 50. That is, the operation detection unit 50 detects a press on each of the tip button 64 and the side button 66 and thus detects an operation on the electronic pen 12.

The hold sensor 70 is a sensor which responds if the electronic pen 12 is held by the user. For example, the hold sensor 70 is a pressure sensor, acceleration sensor or the like. The result of detection by the hold sensor 70 is reported to the operation detection unit 50. Therefore, the operation detection unit 50 can detect an operation on the electronic pen 12, based on the result of detection by the hold sensor 70.

The control unit 40 decides the operation of the communication unit 20, based on a combination of the operation detected by the operation detection unit 50 and the state of the electronic pen 12 detected by the state detection unit 30. Therefore, for example, if the state of the electronic pen 12 is the asynchronous state and the hold sensor 70 continues responding for a predetermined threshold time, the control unit 40 causes the communication unit 20 to transmit the control signal RCL giving an instruction to cancel the standby mode of the projector 100, or the like.

For example, if the electronic pen 12 is not used and the operation mode of the projector 100 shifts to the standby mode, the user can cancel the standby mode of the projector 100 by holding the electronic pen 12. If the hold sensor 70 is an acceleration sensor, the user can cancel the standby mode of the projector 100 by moving the electronic pen 12 via a gesture. Alternatively, the user can cancel the standby mode of the projector 100 by pressing one of the tip button 64 and the side button 66 of the electronic pen 12. Thus, the usability of the display system 1 can be improved.

Modification 2

While the synchronization signal ASL, the pointing element signal PSL, and the control signal RCL are transmitted using infrared light in the embodiment, the synchronization signal ASL, the pointing element signal PSL, and the control signal RCL are not limited to infrared light. For example, the synchronization signal ASL, the pointing element signal PSL, and the control signal RCL maybe transmitted using light outside the visible range other than infrared light. The synchronization signal ASL may also be transmitted via radio waves. In this case, the position detection device 200 includes a radio transmission device instead of the light emitting device 280, and the communication unit 20 includes a radio receiving unit instead of the light receiving unit 22.

Modification 3

While a light emission pattern based on a remote control code is used as the light emission pattern of the control signal RCL in the embodiment, the light emission pattern of the control signal RCL is not limited to the light emission pattern based on the remote control code. For example, a light emission pattern other than the light emission pattern based on the remote control code may be used as the light emission pattern of the control signal RCL.

Modification 4

While a signal giving an instruction to cancel the standby mode of the projector 100 is used as an example of the control signal RCL in the embodiment, the control signal RCL is not limited to the signal giving an instruction to cancel the standby mode of the projector 100. For example, the control signal RCL may be a signal giving an instruction to start up the projector 100 or a signal giving an instruction to transmit the synchronization signal ASL.

Modification 5

While an example where the electronic pen 10 is used in the display system 1 including one projector 100 is described in the embodiment, the system where the electronic pen 10 is used is not limited to the display system 1 including the projector 100. For example, the electronic pen 10 may be used in a display system where two projectors 100 are arranged side by side.

Modification 6

All or a part of the functions of the state detection unit 30, the control unit 40, and the operation detection unit 50 may be implemented by software executed by a CPU or the like, or may be implemented by hardware such as an electronic circuit like a FPGA (field-programmable gate array) or ASIC (application-specific IC). Alternatively, all or a part of the functions of the state detection unit 30, the control unit 40, and the operation detection unit 50 may be implemented by a collaboration of software and hardware.

Modification 7

All or a part of the elements implemented by at least one of the first processing device 240 and the second processing device 330 reading and executing a program may be implemented, for example, by hardware such as an electronic circuit like a FPGA or ASIC, or by a collaboration of software and hardware.

The entire disclosure of Japanese Patent Application No.2018-057644, filed Mar. 26, 2018 is expressly incorporated by reference herein.

What is claimed is:

1. An electronic pen comprising:
    a signal transmitter which communicates with a communication target apparatus; and
    a processor configured to functions as:
        a state detection unit which detects a state of the electronic pen decided by a relation with the communication target apparatus;
        a control unit which changes an operation of the signal transmitter according to the state detected by the state detection unit; and
        an operation detection unit which detects an operation on the electronic pen,
    wherein the control unit decides the operation of the signal transmitter, based on a combination of the operation detected by the operation detection unit and the state detected by the state detection unit.

2. The electronic pen according to claim 1, wherein the state detection unit detects a reception state in the signal transmitter of a signal transmitted from the communication target apparatus, as the state of the electronic pen.

3. The electronic pen according to claim 2, wherein the signal transmitted from the communication target apparatus is a synchronization signal which synchronizes an operation of the electronic pen with an operation of the communication target apparatus.

4. The electronic pen according to claim 3, wherein the state detection unit detects whether or not a period during which the signal transmitter does not receive the synchronization signal is equal to or longer than a predetermined time, as the reception state in the signal transmitter.

5. The electronic pen according to claim 4, wherein the signal transmitter includes a light source which emits light based on control from the control unit, and the control unit switches a light emission pattern of the light emitted from the light source, according to whether or not the period during which the signal transmitter does not receive the synchronization signal is equal to or longer than the predetermined time.

6. The electronic pen according to claim 5, wherein when the period during which the signal transmitter does not receive the synchronization signal is equal to or longer than the predetermined time, and the communication target apparatus is to be instructed to change an operation mode, the control unit causes the light source to emit light with a light emission pattern giving an instruction to change the operation mode of the communication target apparatus.

7. The electronic pen according to claim 6, wherein the light emission pattern giving an instruction to change the operation mode is a light emission pattern based on a remote control code for controlling the communication target apparatus.

8. The electronic pen according to claim 5, wherein when the period during which the signal transmitter does not receive the synchronization signal is shorter than the predetermined time, the control unit causes the light source to emit light synchronously with the synchronization signal, with a predetermined light emission pattern which causes the communication target apparatus to detect a position of the electronic pen.

9. The electronic pen according to claim 4, wherein:
    the processor is further configured to function as an operation detection unit which detects an operation on the electronic pen,
    the synchronization signal is transmitted from the communication target apparatus at a shorter time interval than the predetermined time when an operation mode of the communication target apparatus is a first mode, whereas the synchronization signal is not transmitted from the communication target apparatus when the operation mode is a second mode, and
    the control unit
        causes the signal transmitter to transmit, synchronously with the synchronization signal, a signal with a predetermined pattern which causes the communication target apparatus to detect a position of the electronic pen, when the period during which the signal transmitter does not receive the synchronization signal is shorter than the predetermined time, and causes the signal transmitter to transmit a control signal giving an instruction to shift the operation mode to the first mode, when the period during which the signal transmitter does not receive the synchronization signal is equal to or longer than the predetermined time and the operation detection unit detects the operation.

10. The electronic pen according to claim 1, further comprising an operation input which is operated by a user of the electronic pen and is assigned different kinds of processing according to the state of the electronic pen, wherein the operation detection unit detects an operation on the operation input.

11. A display system comprising a display device which displays an image on a display surface, and an electronic pen which points at the display surface, the electronic pen comprising:

a signal transmitter which communicates with the display device; and a processor configured to functions as:

a state detection unit which detects a state of the electronic pen decided by a relation with the display device;

a control unit which changes an operation of the signal transmitter according to the state detected by the state detection unit; and an operation detection unit which detects an operation on the electronic pen, wherein the control unit decides the operation of the signal transmitter, based on a combination of the operation detected by the operation detection unit and the state detected by the state detection unit.

12. A method for controlling an electronic pen comprising a signal transmitter which communicates with a communication target apparatus, the method comprising:

detecting a state of the electronic pen decided by a relation with the communication target apparatus; and changing an operation of the signal transmitter according to the detected state, wherein whether or not a period during which the signal transmitter does not receive the synchronization signal is equal to or longer than a predetermined time is detected as the reception state in the signal transmitter.

13. The method for controlling the electronic pen according to claim 12, wherein a reception state in the signal transmitter of a signal transmitted from the communication target apparatus is detected as the state of the electronic pen.

14. The method for controlling the electronic pen according to claim 13, wherein the signal transmitted from the communication target apparatus is a synchronization signal which synchronizes an operation of the electronic pen with an operation of the communication target apparatus.

15. The method for controlling the electronic pen according to claim 14, wherein the signal transmitter switches a light emission pattern of emitted light according to whether or not the period during which the signal transmitter does not receive the synchronization signal is equal to or longer than the predetermined time.

16. The method for controlling the electronic pen according to claim 15, wherein when the period during which the signal transmitter does not receive the synchronization signal is equal to or longer than the predetermined time, and the communication target apparatus is to be instructed to change an operation mode, light is emitted with a light emission pattern giving an instruction to change the operation mode of the communication target apparatus.

17. The method for controlling the electronic pen according to claim 16, wherein the light emission pattern giving an instruction to change the operation mode is a light emission pattern based on a remote control code for controlling the communication target apparatus.

18. The method for controlling the electronic pen according to claim 15, wherein when the period during which the signal transmitter does not receive the synchronization signal is shorter than the predetermined time, light is emitted synchronously with the synchronization signal, with a predetermined light emission pattern which causes the communication target apparatus to detect a position of the electronic pen.

* * * * *